(12) United States Patent
Hickman et al.

(10) Patent No.: US 9,183,672 B1
(45) Date of Patent: Nov. 10, 2015

(54) EMBEDDABLE THREE-DIMENSIONAL (3D) IMAGE VIEWER

(71) Applicant: Google Inc., Mountain View, CA (US)

(72) Inventors: Ryan Hickman, Mountain View, CA (US); James J. Kuffner, Jr., Mountain View, CA (US); Anthony Gerald Francis, Jr., San Jose, CA (US); Arshan Poursohi, Berkeley, CA (US); James R. Bruce, Sunnyvale, CA (US); Thor Lewis, San Francisco, CA (US); Chaitanya Gharpure, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 13/895,167

(22) Filed: May 15, 2013

Related U.S. Application Data

(63) Continuation-in-part of application No. 13/564,911, filed on Aug. 2, 2012, now Pat. No. 8,456,467.

(60) Provisional application No. 61/558,901, filed on Nov. 11, 2011, provisional application No. 61/640,484, filed on Apr. 30, 2012.

(51) Int. Cl.
   *G06T 17/00* (2006.01)
   *G06T 19/00* (2011.01)

(52) U.S. Cl.
   CPC *G06T 17/00* (2013.01); *G06T 19/00* (2013.01)

(58) Field of Classification Search
   CPC ...... G06T 17/00; G06T 19/00; G06F 17/2785
   See application file for complete search history.

(56) References Cited

U.S. PATENT DOCUMENTS

| | | | |
|---|---|---|---|
| 2002/0093538 A1 | 7/2002 | Carlin | |
| 2002/0154174 A1 | 10/2002 | Redlich et al. | |
| 2004/0239679 A1* | 12/2004 | Ito et al. | 345/555 |
| 2006/0119618 A1 | 6/2006 | Knighton et al. | |
| 2007/0185865 A1* | 8/2007 | Budzik et al. | 707/5 |
| 2009/0043789 A1* | 2/2009 | Gupta | 707/100 |
| 2009/0079743 A1* | 3/2009 | Pearson et al. | 345/473 |
| 2012/0102416 A1* | 4/2012 | Chmiel | 715/760 |
| 2012/0259738 A1* | 10/2012 | Pillai | 705/26.61 |

OTHER PUBLICATIONS

Guha, Ramanathan, Rob McCool, and Eric Miller. "Semantic search." Proceedings of the 12th international conference on World Wide Web. ACM, 2003.*
Autodesk 123D Catch, Catch and carry, Turn ordinary photos into extraordinary 3D models, www.123dapp.com/catch, Jan. 21, 2013.

* cited by examiner

*Primary Examiner* — Kee M Tung
*Assistant Examiner* — Ryan M Gray
(74) *Attorney, Agent, or Firm* — McDonnell Boehnen Hulbert & Berghoff LLP

(57) ABSTRACT

Methods and systems for providing a three-dimensional (3D) image viewer in a webpage are provided. According to an example method, a webpage may be provided, and the webpage may include embedded language that identifies a 3D image viewer to be provided within the webpage. Based on the embedded language, a computer having a processor and a memory may request information associated with rendering a 3D object data model in the 3D image viewer. The method may also include providing the 3D image viewer within the webpage, and receiving information associated with rendering the 3D object data model. Additionally, the 3D object data model may be rendered in the 3D image viewer based on the received information. Additional example systems and methods are described herein.

14 Claims, 16 Drawing Sheets

EMBEDDABLE THREE-DIMENSIONAL (3D) IMAGE VIEWER

CROSS-REFERENCE TO RELATED APPLICATIONS

This application is a continuation-in-part of U.S. patent application Ser. No. 13/564,911 filed Aug. 2, 2012, the entire contents of which are hereby incorporated by reference.

This application claims the benefit of, and incorporates by reference in their entirety, the following U.S. Provisional Patent Applications: U.S. Provisional Application No. 61/558,901 filed on Nov. 11, 2011 and U.S. Provisional Application No. 61/640,484 filed on Apr. 30, 2012.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or based on data from objects that are scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one example aspect, a method is provided that comprises receiving search results generated in response to a search query. The search results include semantic-search information related to the search query and embedded instructions associated with providing a three-dimensional (3D) image viewer. The 3D image viewer is configured to render a 3D object data model associated with the semantic-search information. The method also involves providing the search results within a webpage. At least a portion of the received search results are provided within a search result summary section on the webpage. Further, the method involves providing within the search result summary section on the webpage a user-selectable item for invoking the 3D image viewer.

In another example aspect, a computing device that comprises a processor and a computer-readable medium is provided. The computer-readable medium is configured to store instructions, that when executed by the processor cause the computing device to perform functions. The functions include receiving search results generated in response to a search query. The search results include semantic-search information related to the search query and embedded instructions associated with providing a three-dimensional (3D) image viewer. The 3D image viewer is configured to render a 3D object data model associated with the semantic-search information. The functions also include providing the search results within a webpage. At least a portion of the received search results are provided within a search result summary section on the webpage. The functions further include providing within the search result summary section on the webpage a user-selectable item for invoking the 3D image viewer.

In still another example aspect, a method is provided that comprises providing a webpage. The webpage includes embedded instructions that identify a three-dimensional (3D) image viewer associated with the webpage. The method also involves, based on the embedded instructions, a computer having a processor and a memory requesting information associated with rendering a 3D object data model in the 3D image viewer. The embedded instructions further identify the 3D object data model and one or more parameters associated with rendering the 3D object data model. The method further involves receiving the information associated with rendering the 3D object data model in the 3D image viewer. Additionally, the method involves providing the 3D image viewer associated with the webpage, and rendering the 3D object data model in the 3D image viewer based on the received information.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for providing a three-dimensional (3D) image viewer in a webpage. In some examples, markup language for a webpage (e.g., HTML) may include embedded language for creating a 3D image viewer in a webpage. A webmaster may use JavaScript for example to interact with an application programming interface (API) and control rendering of 3D images within the 3D image viewer. In some examples, the API and associated customization parameters may provide a high level command set for embedding real-time, interactive 3D object data models within a webpage. For example, the 3D image viewer may provide a dynamic 3D image that may rotate, scale, animate, or otherwise change. Additionally, in some examples, the 3D image viewer may provide an interactive 3D image that can be manipulated by a user via the 3D image viewer. As an example, a user may rotate, pan, orbit, or zoom in on a rendered 3D object data model using the 3D image viewer.

The 3D image viewer described herein facilitates rendering 3D computer graphics based on a 3D object data model. For example, the 3D image viewer may utilize 3D rendering techniques to allow a 3D object data model to be displayed visually as a two-dimensional image. Note that no special eyewear is needed to view a rendered 3D object data model in the 3D image viewer.

Figure 1:
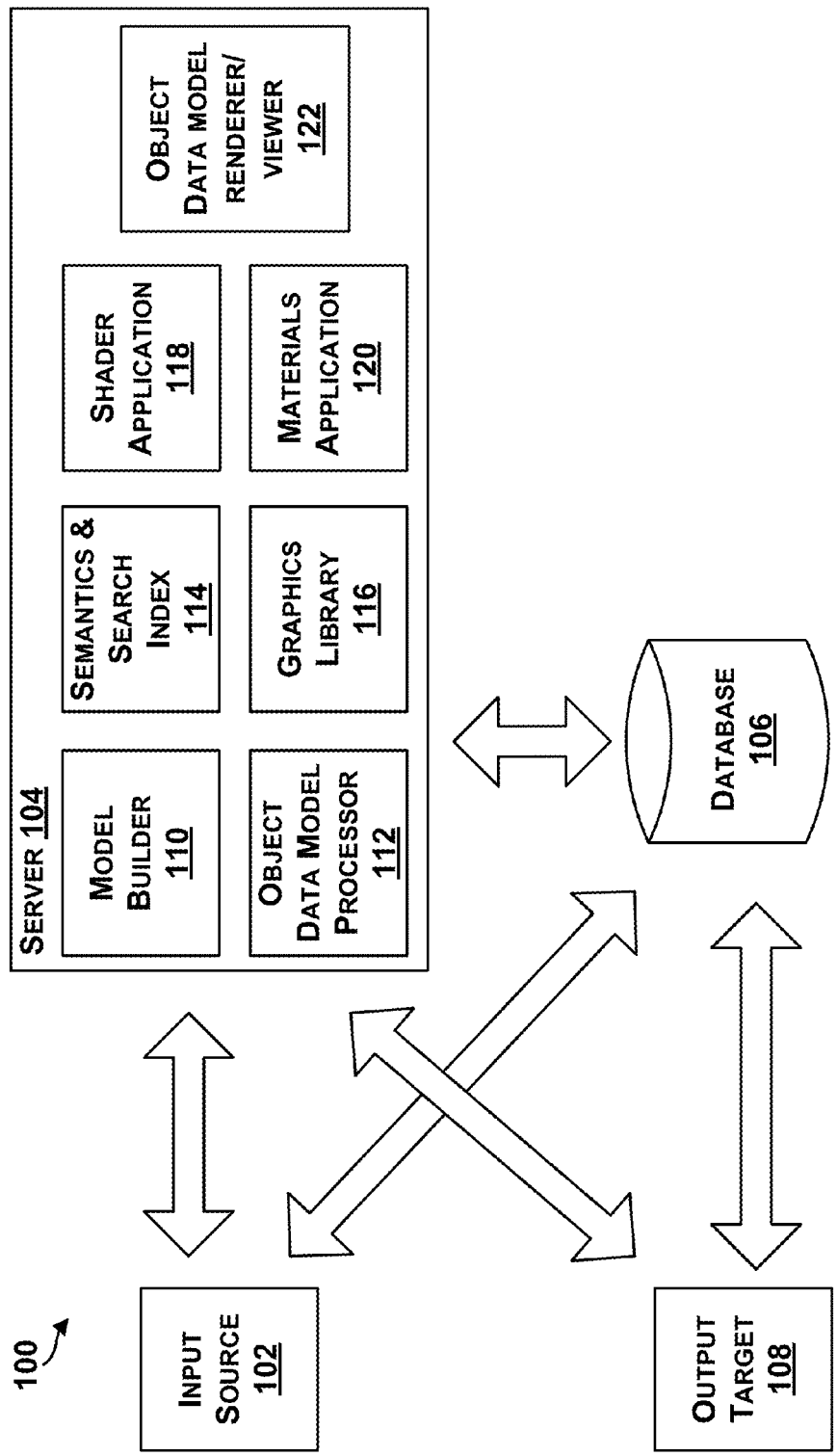
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV unwrapping to generate a mesh (D) with UV unwrapping but no colors. UV unwrapping refers to the unwrapping of a 3D mesh to a 2D space for texturing purposes, where the 2D space is denoted, by convention, with "u" and "v" coordinates since "x", "y", and "z" are used for 3D space. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
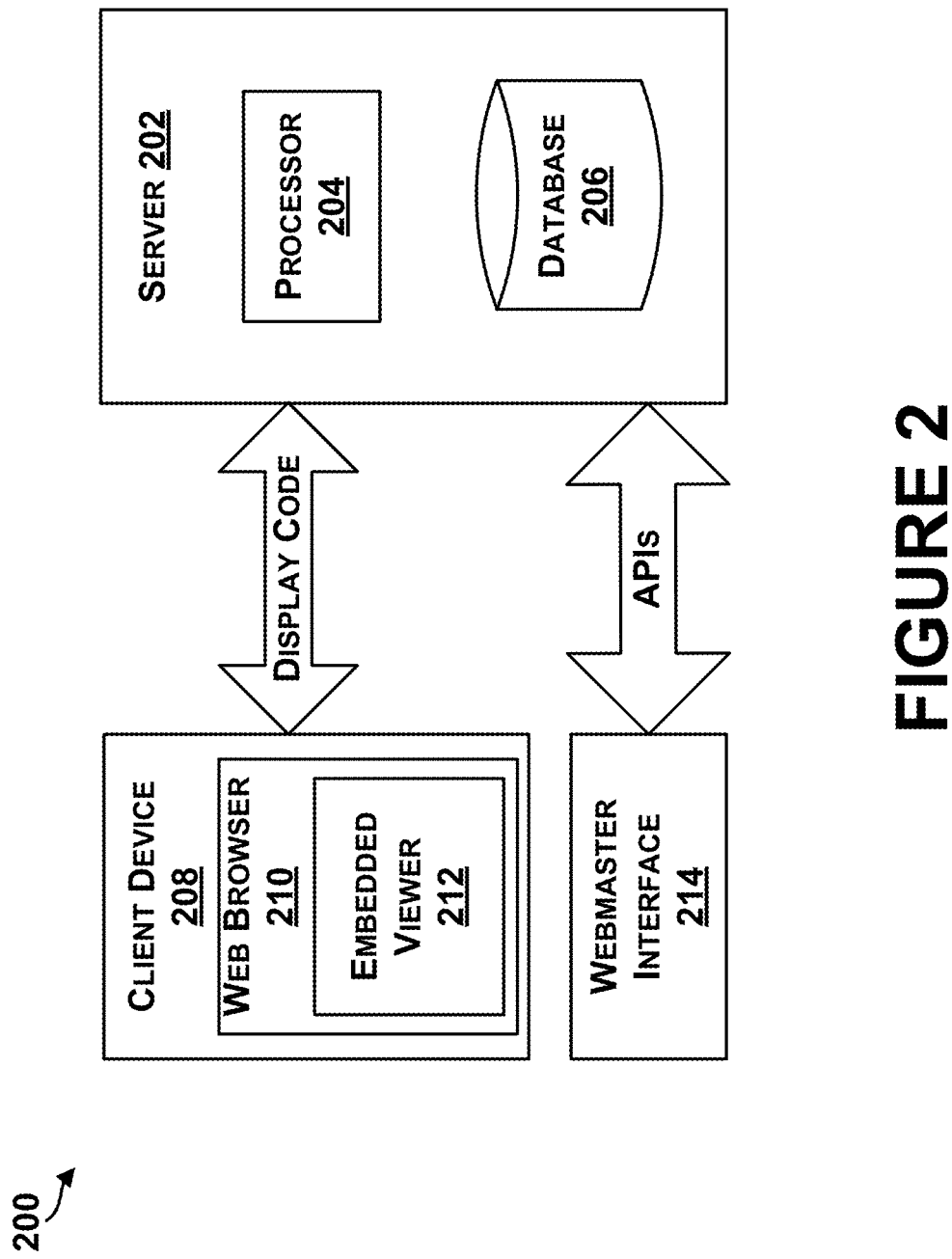
FIG. 2 illustrates an example system for providing a three-dimensional (3D) image viewer.

FIG. 2 illustrates an example system 200 for providing a three-dimensional (3D) image viewer. The system may include a server 202 including a processor 204 and database 206. The server 202 may be configured to provide information associated with 3D object data models to one or more output targets. For example, the processor 204 may be coupled to the database 206, and the database 206 may include information associated with a plurality of 3D object data models. In one instance, the server 202 may be configured to serve a rendered 3D image and/or instructions for rendering a 3D image using graphics software such as WebGL, OpenGL ES, etc., to a client device 208. The 3D image may be a real-time, interactive 3D object data model in some instances.

In one example, WebGL may be used to render a 3D object data model within a web browser 210 on the client device 208. For example, based on information received from the server 202, the web browser 210 may display a webpage having an embedded viewer 212.

In some examples, the embedded viewer 212 may be embedded directly within a webpage with JavaScript or other scripting languages. For example, JavaScript may be used to render an iframe (or inline frame). In other examples, the embedded viewer 212 may be included within a webpage by pasting a block or section of HTML into code for the webpage. The block of HTML may describe information associated with parameters for customizing a 3D image viewer. For instance, the block of HTML may identify a 3D object data model to be accessed from the database 206 of the server 202.

The system 200 may also include a webmaster interface 214. In some examples, a user may configure parameters of the embedded viewer 212 using an application programming interface (API) and the webmaster interface 214. For example, the API may be a set of rules and specifications that a user can follow to communicate with the server 202. In one instance, the API may define vocabularies or function-calling conventions associated with the processor 204 and database 206. In another instance, the API may include specifications of routines, data structures, object classes, protocols, etc. to communicate with software in the server 202 using language of the webpage (e.g., JavaScript). A user may select options for a 3D image viewer or input code within a template using the webmaster interface 214. Subsequently, a processor may generate code according to the API specifications that a user may paste into embedded language or instructions of a webpage. In some instances, the webmaster interface 214 may provide a high level interface (e.g., more simple) for controlling a 3D image rendered using complex graphics software (e.g., WebGL).

In some examples, the generated code may include HTML language referencing a version of the API and/or server hosting the API. In one example, the API may be a public API that is freely available. In other examples, the API may be licensed to authorized retailers for a fee. For example, retailers may wish to embed 3D image viewers within a webpage to display a 3D object data model of one or more of their products and seek a license to use the API.

Using the webmaster interface 214, a user may define parameters for customizing the embedded viewer 212 (e.g., size, background, user interface options, etc.) as well as parameters for customizing/controlling a rendering of a 3D object data model within the embedded viewer 212 (e.g., size, animation, camera angle, orientation, zoom level, color, texture, shading, overlays, etc.). In some examples, the user may be able to make a customized version of the embedded viewer 212 by coding a modified embedded viewer manually (e.g., without the user of the webmaster interface 214). This may allow the user to incorporate advanced features specific to a given type of embedded viewer.

In other examples, the webmaster interface 214 may facilitate providing an embedded viewer within a webpage by use of drag-and-drop functionality. For example, a user may select an embedded viewer type from the webmaster interface 214, drag the selected viewer onto code for the webpage, and drop the embedded viewer within the webpage code. In one instance, the webmaster interface 214 may be provided on a website. A user may select parameters associated with the embedded viewer via the website, and drag-and-drop a customized embedded viewer to a webpage. In a further example, the user may be prompted to provide parameters upon dropping an embedded viewer object onto code for a webpage. For example, the user may be prompted to input information about a size or color of the embedded viewer, a 3D object data model to be provided within the embedded viewer, a pose or other parameters associated with the 3D object data model, an animation sequence for a camera (such as a series of camera poses and corresponding time stamps) or the 3D object data model (such as a series of object poses and time stamps), etc., after dropping the embedded viewer into a block of code.

Thus, in some examples, the system 200 may enable a 3D image viewer to be provided within a webpage and controlled using high level API scripting.

Figure 3:
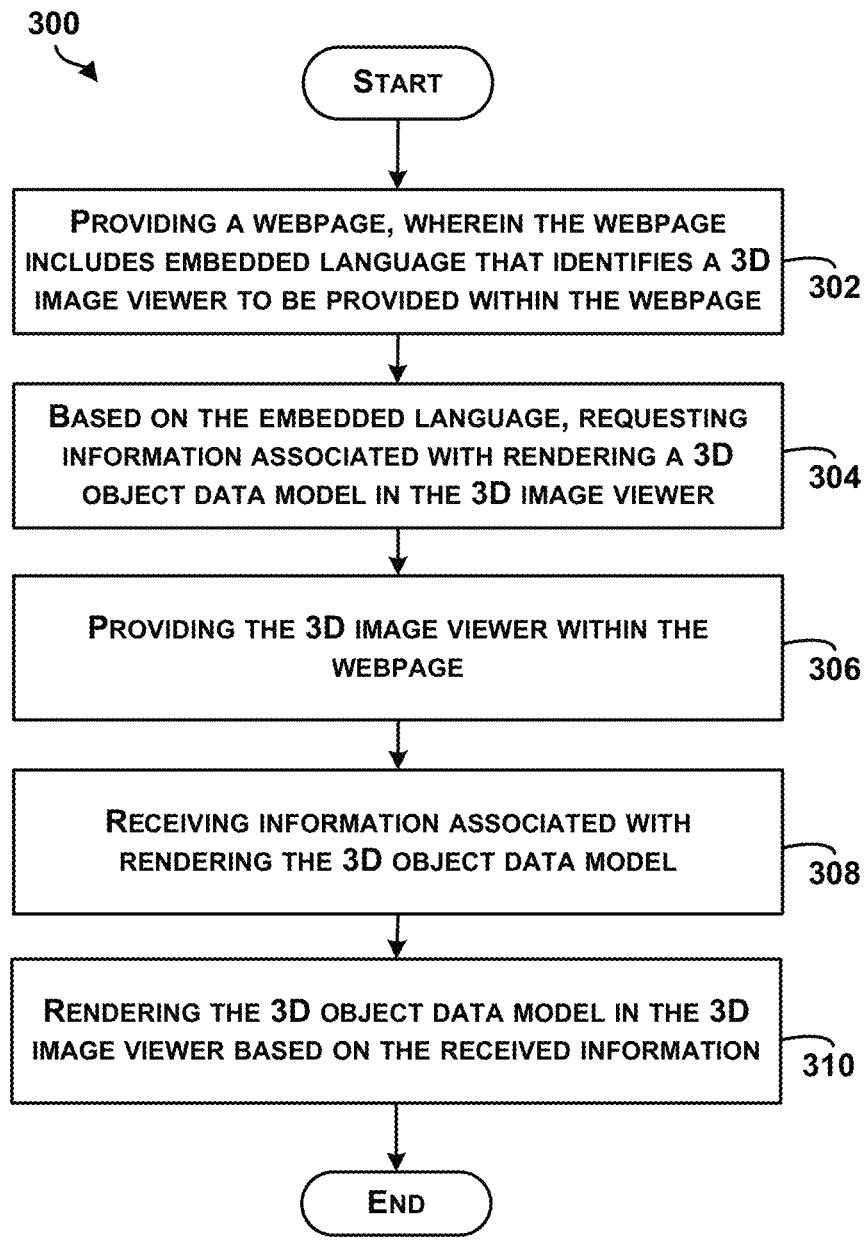
FIG. 3 is a block diagram of an example method for providing a three-dimensional (3D) image viewer within a webpage.

In one example, a client device may be configured to request information associated with rendering a 3D object data model in a 3D image viewer from a server. For instance, the request may be determined or triggered based on a portion of embedded language or instructions provided within embedded language of a webpage. FIG. 3 is a block diagram of an example method for embedding a three-dimensional (3D) image viewer in a webpage.

Method 300 shown in FIG. 3 presents an embodiment of a method that could be used by the systems 100 or 200 of FIGS. 1-2 or components of the systems 100 or 200 such as the client device 208, for example. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

Initially, at block 302, the method 300 includes providing a webpage. For example, the webpage may be provided by a client device and may include embedded language or instructions that identify a 3D image viewer to be provided within the webpage. In some examples, the webpage may be loaded on a web browser of a desktop computer, laptop computer, tablet computer, mobile device, television, or other type of computing device. Markup language defining the webpage such as HTML or HTML5 may include a portion of code associated with a 3D image viewer to be embedded within the webpage. For example, the 3D image viewer may be embedded within an inline frame (iframe) of HMTL language enabling the 3D image viewer to be modified on the webpage without requiring the entire webpage to be updated.

In some examples, the embedded language may define customization parameters for the 3D image viewer. Example parameters include defining a size of the 3D image viewer (e.g., a pixel size or a percentage relative to a default size, full screen, etc.), a background of the 3D image viewer (e.g., an image selected from default images or custom two-dimensional image that is selected by a user), or a location of the 3D image viewer on the webpage. Other example parameters include an overlay for the 3D image viewer (such as a transparent advertisement) or an embeddable button (such as button within the 3D image viewer that a user may click or select to cause a function). In one instance, clicking an embeddable button may cause a 3D object data model within the 3D image viewer to spin or rotate. In another instance, an embeddable button may cause a 3D object data model to snap or transition to a predetermined camera position or object pose.

In other examples, the embedded language may define customization parameters for a 3D object data model to be provided within the 3D image viewer. For example, parameters may define a 3D pose, a camera position, a level of zoom, an animation sequence, an annotation for a component of the 3D object data model, a shader, a mesh resolution or size, etc., for the 3D object data model.

In some instances, the parameters for the 3D image viewer and/or the 3D object data model may be input with reference to an application programming interface (API). In one example, a computing device displaying the webpage may load one or more libraries associated with the API to provide functionality.

At block 304, the method 300 includes based on the embedded language, requesting information associated with rendering a 3D object data model in the 3D image viewer. In some examples, the embedded language may identify the 3D object data model and one or more parameters associated with rendering the 3D object data model. For instance, the parameters may be specified with reference to definitions associated with an API. In one example, the embedded language may trigger the client device to request the information associated with rendering the 3D object data model in the 3D image viewer.

At block 306, the method 300 includes providing the 3D image viewer within the webpage. For instance, information may be received by the client device from a server extending the capability of JavaScript programming language to allow the JavaScript to provide the 3D image viewer within the webpage. In another example, providing the 3D image viewer within the webpage may involve causing the 3D image viewer to be provided in an application that overlays a portion of the webpage. For example, the application may be a plug-in or other type of web-based applet that runs within the scope of a web browser that provides the webpage. Additionally, contents of the webpage which are not overlaid by the application may be obscured by providing a semi-transparent graphic onto the contents of the webpage. Other display arrangements may be implemented as well to provide visual contrast between the 3D image viewer and other content of the webpage.

At block 308, the method 300 includes receiving information associated with rendering the 3D object data model. Information may be received by the client device from a server to allow JavaScript or other scripting languages to generate an interactive 3D object data model within the 3D image viewer. In one example, the information may be commands or function calls associated with WebGL, Open GL ES, or other graphics software for rendering real-time, interactive 3D graphics based on the parameters associated with the 3D object data model. For instance, a rendering pipeline may be used to carry out multiple draw jobs or calls within a graphics processing unit. JavaScript may be used to specify where in a 3D scene to draw a unit (such as a triangle), and how the unit should look (e.g., a color, shade, texture, etc.). The information may then be provided to the graphics processing unit which renders the scene.

At block 310, the method 300 includes rendering the 3D object data model in the 3D image viewer based on the received information. In some examples, the 3D object data model may be an interactive 3D graphic rendered by the client device with which a user may interact. For example, a user may pan, orbit, or zoom the 3D object data model via an input device or method.

In one example, the embedded language may describe when to load or render a 3D object data model within the 3D image viewer. For example, the 3D object data model may be rendered when the webpage is loaded. In one instance, a still two-dimensional image may be loaded initially as a placeholder/substitute for the 3D object data model while the 3D object data model loads. In some instances, the still image may take a fraction of a second to load, and may be replaced once the 3D object data model has loaded (e.g., after 3 seconds).

The still image may be an image that is rendered by a server based on the parameters associated with rendering the 3D object data model and sent to the webpage. For instance, if embedded language defines a background, level of zoom, and camera position for the 3D object data model, an image of the 3D object data model having the appropriate background, level of zoom, and camera position may be rendered from the 3D object data model in the server and sent to the webpage of the client device. In other examples, the 3D object data model may be rendered when a user clicks on the embedded viewer or when a user scrolls down a webpage such that the embedded viewer is visible.

In a further instance, an indication may be provided when the 3D image has been loaded. For example, an animation sequence may begin when the 3D object data model has been loaded. As an example, the 3D object data model may rotate, hover, or wiggle, etc., after loading is complete.

In some examples, the location of the 3D image viewer may be defined within the embedded language by reserving a space in a web browser's document object model (DOM). The embedded language may also include instructions for controlling interactions with the 3D object data model. For example, JavaScript may define events based on user interface events such as a click, double-click, mouse up, mouse down, etc. over and/or near the 3D object data model. In one instance, clicking and dragging may enable a user to rotate the 3D image. It is also contemplated that the 3D object data model may be provided on other interfaces (e.g., touchscreen interfaces) and may be controlled with respect to input methods of the respective interfaces. Responses to any number of functionalities of the embedded 3D image viewer may also be defined within the embedded language.

Figure 4A:
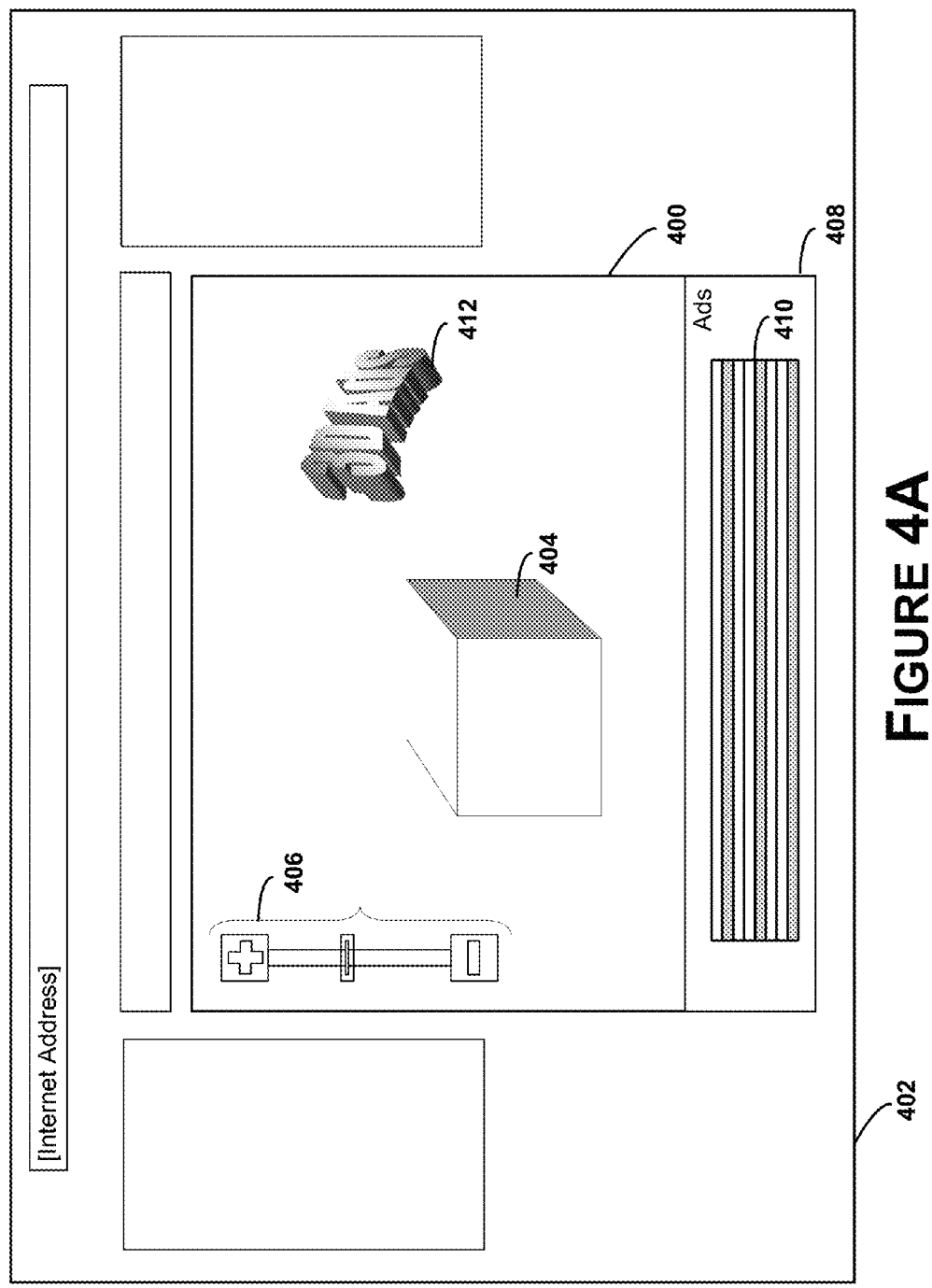
FIG. 4A shows an example display of a three-dimensional (3D) image viewer.

In some examples, the embedded language may include information associated with overlays or additional information for a 3D object data model. FIG. 4A shows an example display of a three-dimensional (3D) image viewer 400. As shown in FIG. 4A, the 3D image viewer 400 may be provided within a webpage 402. The webpage 402 may include miscellaneous information and content such as textual content, graphics, hyperlinks, etc. The 3D image viewer may be configured to render a 3D image 404 representing a 3D object data model of an object. In one instance, the 3D image viewer 400 may be configured to receive a 3D object data model file from a server having data for rendering the 3D image.

The 3D image viewer 400 may include a zooming tool 406 such that a user may be able to zoom in or out to focus on features or components of the object displayed in the 3D image viewer 400. In other instances, a user may zoom on components of the object by scrolling a wheel of a mouse or providing a gesture on a touchscreen. Other tools, capabilities, and functionalities are also possible.

In one instance, the 3D image viewer 400 may include an advertisement space 408. In an example, the 3D image viewer 400 may be configured to provide advertising information 410 associated with the object depicted in 3D image 404. For example, the advertising information 410 may include text, images, audio, or video. Additionally, the 3D image viewer 400 may be configured to provide other forms of advertisements in the 3D image viewer 400. For example, the 3D image viewer 400 may provide one or more 3D advertisements 412. In one instance, the 3D advertisement 412 may be a transparent or partially transparent overlay. Additionally, or alternatively, the 3D advertisement 412 may be static or may be animated in the 3D image viewer 400. For example, the 3D advertisement 412 may move or change positions with respect to the 3D mage 402.

Figure 4B:
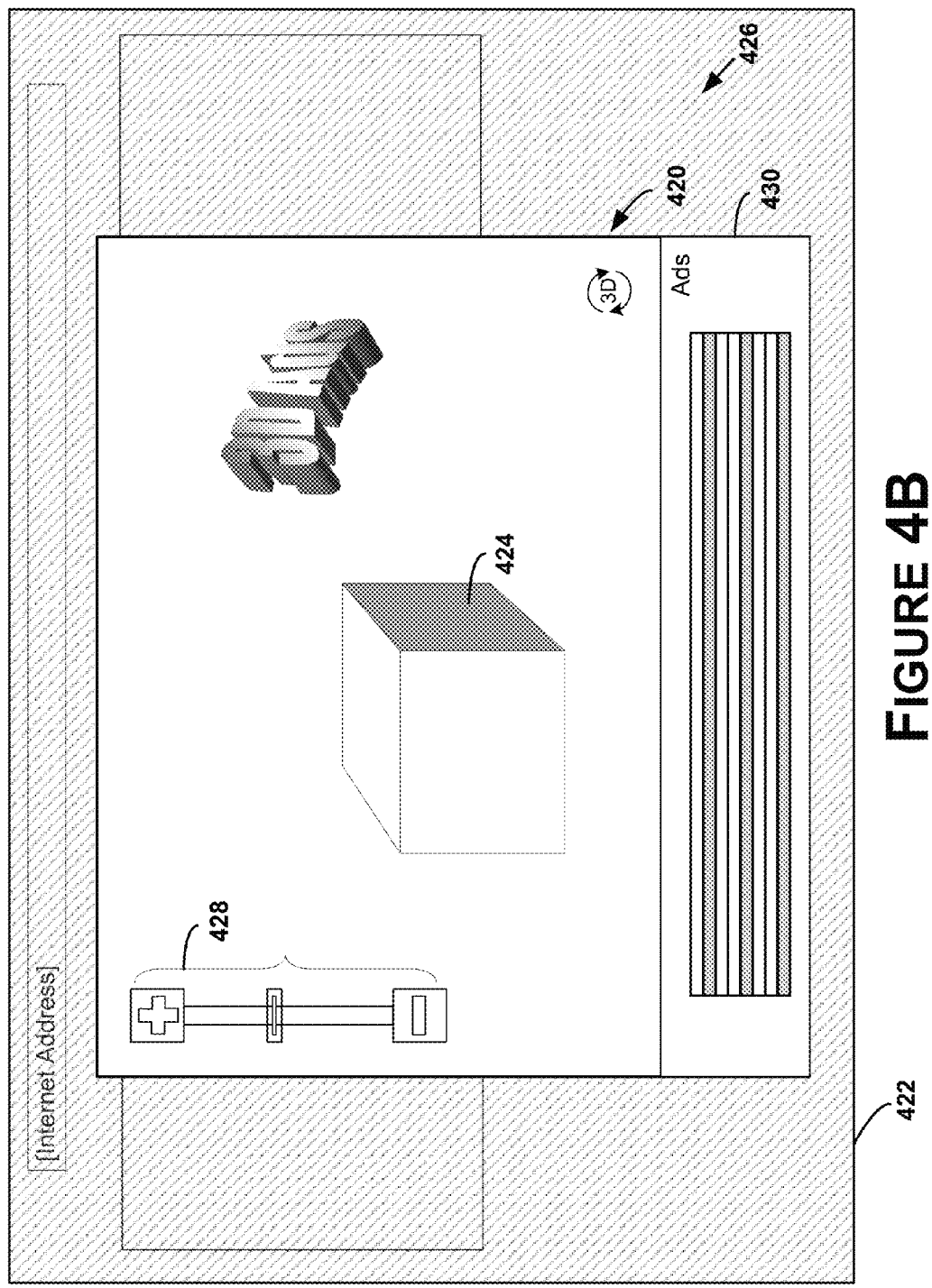
FIG. 4B shows another example display of a three-dimensional (3D) image viewer.

FIG. 4B shows another example display of a 3D image viewer 420. The 3D image viewer 420 may be associated with a webpage 422 and configured to render a 3D image 424 representing a 3D object data model of an object. The webpage 422 may include miscellaneous information and content such as textual content, graphics, hyperlinks, etc. As shown in FIG. 4B, the 3D image viewer 420 may be provided in an application overlaying the webpage 422. For example, the application may be a plug-in or other type of web-based applet that runs within the scope of a web browser that provides the webpage. Additionally, content of the webpage 422 may be greyed-out or otherwise obscured by providing a semi-transparent graphic 426 overlaid onto the contents of the webpage 422. Other example configurations are also possible. For instance, in another example, content of the webpage 422 that is not obscured by the application may remain fully visible.

The 3D image viewer 420 may also include features that are similar to the features of the 3D image viewer 402 of FIG. 4B, such as a zooming tool 428 and advertisement space 430.

Figure 5A:
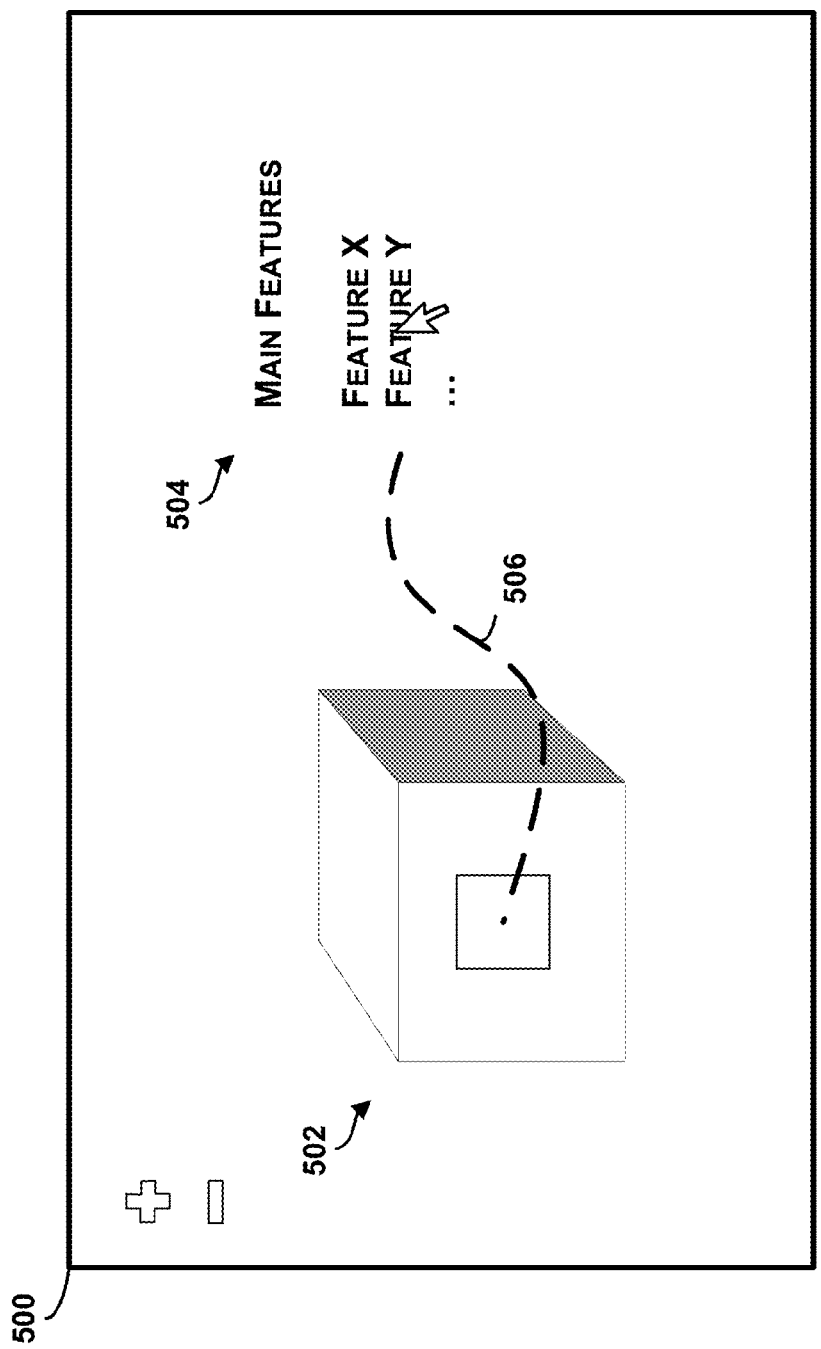
FIGS. 5A-5B show additional example displays of a three-dimensional (3D) image viewer.
Figure 5B:
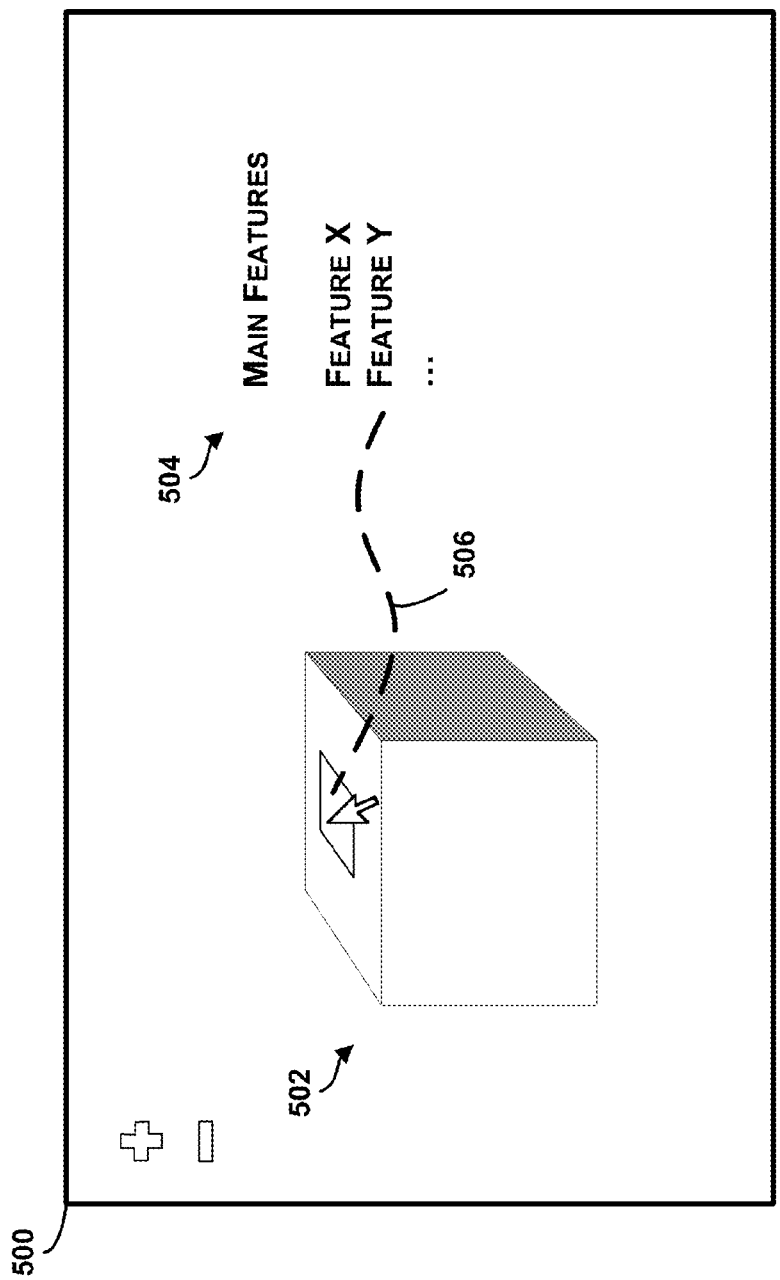

In other examples, a 3D image viewer may include additional or other types of overlays. FIGS. 5A-5B show additional example displays of a three-dimensional (3D) image viewer. As shown in FIG. 5A, a display 500 may include a 3D image 502 and an overlay 504. The overlay 504 may be defined by plain HTML (e.g., text strings with style characteristics). In some examples, embedded language associated with the 3D image viewer may describe control of the overlay 504. For example, a separate file referenced in embedded language of a webpage or associated with the 3D object data model may specify where the overlay 504 is rendered with respect to the 3D image 502.

As an example, a position of the overlay 504 may be defined relative to a position of the 3D image 502. For instance, the overlay 504 may be attached to a geometric location on or near the 3D image 502. In other examples, a position of the overlay 504 may be defined with respect to a three-dimensional coordinate space defined by the display 500 or a scene of the 3D image.

In one example, a user may click on or otherwise select a portion of the overlay 504, and an action may occur. For instance, a user may click on "Feature Y" and a line 506 may be rendered between the location of the overlay 504 and a geometric position of the "Feature Y" on the 3D image 502. In some examples, this may be accomplished based on anchors associated with the overlay 504 in the embedded language. For instance, the overlay 504 or a portion of the overlay 504 may be associated with a geometric position of the 3D image 502.

In some examples, the 3D image 502 may be in a first orientation at a first instance in time prior to the user clicking on the overlay 504. After the user clicks on the overlay 504, the 3D image 502 may animate to move to a different orientation. For instance, a camera angle of the 3D image 502 may be modified so that the 3D image 502 rotates and the "Feature Y" of the 3D image 502 is oriented towards a user (not shown).

As shown in FIG. 5B, in another example, a user may click on or otherwise indicate a position of the 3D image 502. In one instance, in response to the indication, a line 506 may be rendered from a component of the 3D image 502 to a position with respect to the overlay 504 associated with the position on the 3D image 502. Thus, in some examples, overlays within the 3D image viewer may be associated with one or more components of a 3D object data model.

Figure 6:
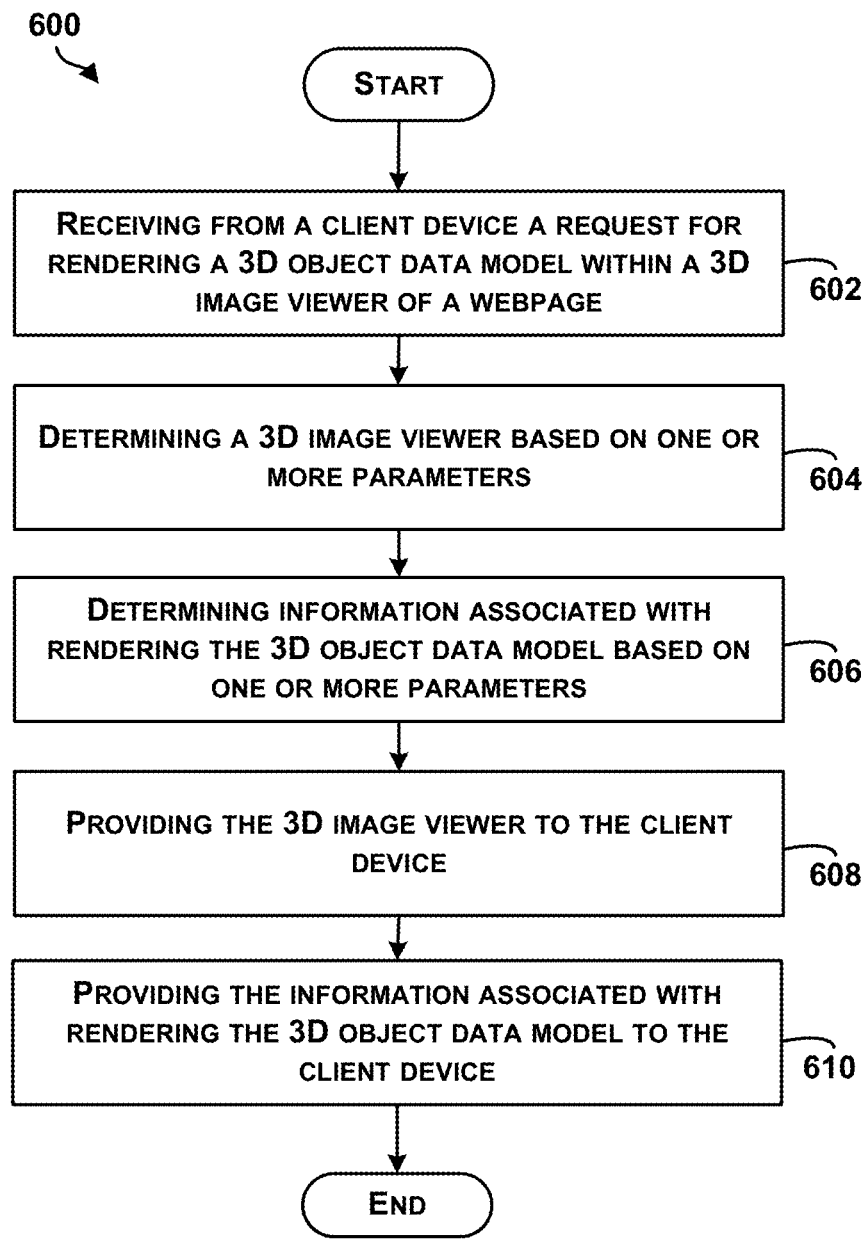
FIG. 6 is a block diagram of another example method for providing a three-dimensional (3D) image viewer within a webpage.

In some examples, a server, such as the server 100 of FIG. 1 or the server 202 of FIG. 2, may be configured to determine and provide a 3D image viewer and information associated with rendering a 3D object data model within the 3D image viewer in response to a request from a client device. FIG. 6 is a block diagram of another example method 600 for providing a three-dimensional (3D) image viewer within a webpage.

Method 600 may include one or more operations, functions, or actions as illustrated by blocks 602-610 of the flow chart. Although the blocks are illustrated in a sequential order, these blocks may also be performed in parallel, and/or in a different order than those described herein. Also, the various blocks may be combined into fewer blocks, divided into additional blocks, and/or removed from the flow chart, based upon the desired implementation of the method 600. Each block may represent a module, a segment, or a portion of program code, which includes one or more instructions executable by a processor for implementing specific logical functions or steps in the process. In addition, each block in FIG. 6 may represent circuitry that is wired to perform the specific logical functions in the process.

Initially, at block 602, the method 600 includes receiving from a client device a request for rendering a 3D object data model within a 3D image viewer of a webpage. In one example, the client device may communicate with the server via a wired or wireless connection. For instance, the client device may communicate with the server via the Internet or an intranet. In some examples, the request may include one or more parameters associated with the 3D image viewer (e.g., a 3D image viewer color, a 3D image viewer size, a background image, an overlay, an embeddable button, etc.) and/or one or one or more parameters associated with rendering the 3D object data model (e.g., a 3D pose, a camera position, a level of zoom, an animation, an annotation for a component of the 3D object data model, a shader, etc.). In some instances, JavaScript or other types of scripting languages may execute embedded language, such as API function calls, to communicate the request to the server.

At block 604, the method 600 includes determining a 3D image viewer based one or more parameters. For example, embedded language may identify a type of 3D image viewer, and a processor in the server may customize a default 3D image viewer based on the one or more parameters associated with the 3D image viewer. In other examples, a default 3D image viewer may be determined for the request by selecting a default 3D image viewer from a database.

At block 606, the method 600 includes determining information associated with rendering the 3D object data model based on one or more parameters. For example, a processor may locate a 3D object data model file associated with a request. In some examples, the processor may determine an appropriate resolution of the 3D object data file based on parameters associated with a request. For example, the 3D object data model file may include multiple levels of material and/or geometry information for an object that may be selected from. In some examples, the server may also render a 3D object data model based on the one or more parameters associated with the 3D object data model.

At block 608, the method 600 includes providing the 3D image viewer to the client device. In some examples, the 3D image viewer may be provided to the client device by a web server. A client device may download information from the web server to display the 3D image viewer within a web browser (e.g., within a portion of a webpage).

At block 610, the method 600 includes providing the information associated with rendering the 3D object data model to the client device. For example, information such as where to render shapes within the 3D image viewer and how the shapes should look (e.g., color texture, shades, etc.) may be provided from the server to a client device. In one instance, the information may be control codes and shader codes for execution by a WebGL program on the client device. For example, the information may allow a graphics processing unit of the client device to render a 3D image of the 3D object data model.

The method 600 may also include determining a capability level of a client device and comparing the capability level to a performance threshold. Based on a comparison of the capability level and the performance threshold, the server may also render images of the 3D object data model having views of the 3D object data model from predetermined positions around an axis of rotation of the 3D object data model. Subsequently the images may be provided to the client device and facilitate display of a swivel viewer.

As an example, embedded language associated with a request for a 3D image viewer may define a performance threshold associated with the 3D image viewer. For example, a mobile device may have a lower performance level than a desktop computer due to processing capabilities or the availability of a browser supporting WebGL or OpenGL ES. In one instance, when a request for the 3D image viewer is received from a web browser or client device that does not meet the performance threshold, instructions for rendering of the 3D object data model may be altered. For example, the 3D image viewer may be replaced by a swivel viewer, rather than an interactive, real-time 3D image viewer. As with the 3D image viewer, a swivel viewer may also be associated with a webpage and provided within the webpage or in an application overlaying the webpage. Thus, any of the examples described herein with respect to an embeddable 3D image viewer associated with a webpage, may also be applicable to an embeddable swivel viewer.

Figure 7:
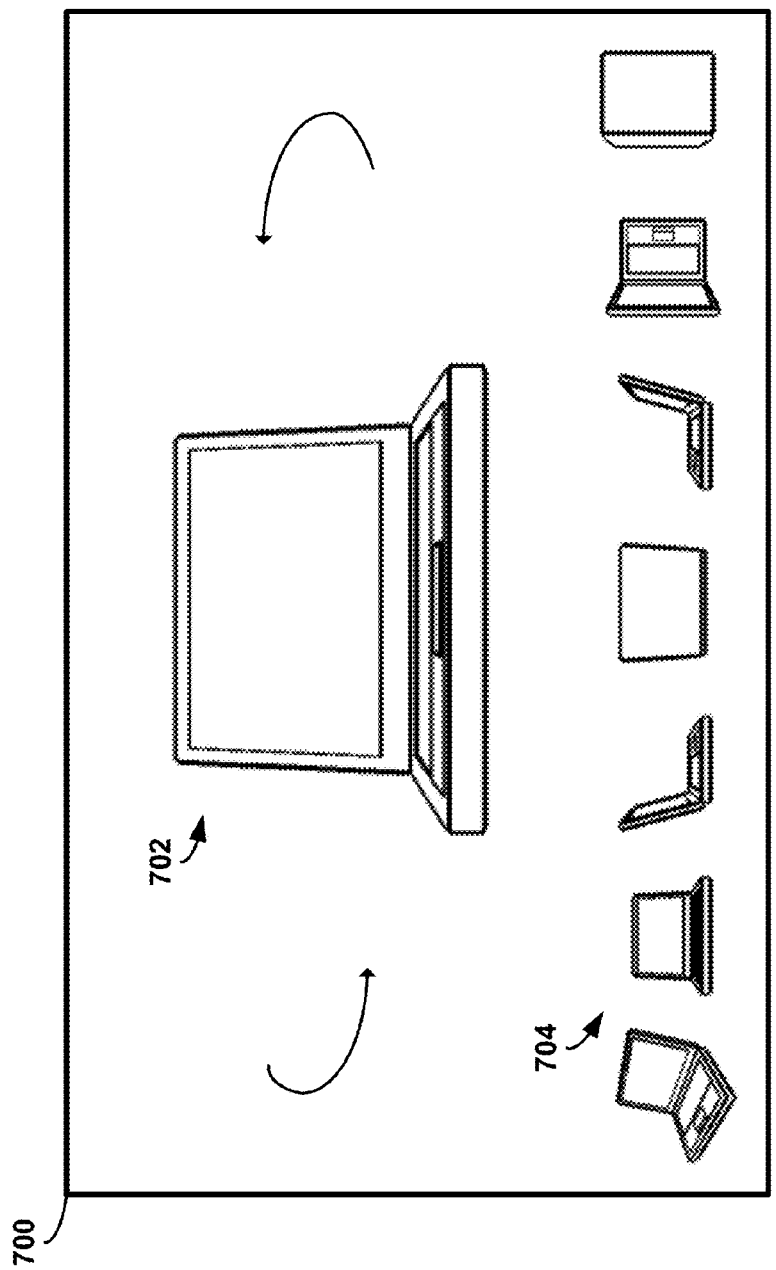
FIG. 7 shows an example display of a swivel viewer.

FIG. 7 shows an example display of a swivel viewer 700. As shown in FIG. 7, the swivel viewer 700 may be configured to display an image 702 of an object. For example, the image 702 may be an image captured from a rendering of the 3D object data model having a front camera position. In some examples, a user may click or otherwise input a modification to the swivel viewer to cause other images of the object to be displayed. For example, the other images may be images of the object rendered from separate positions around an axis of rotation of the object. In one instance, a user may click and drag to the left or right to cause the image 702 displayed by the swivel viewer 700 to change. In another example, a user may perform a gesture (e.g., a swipe) on a touchscreen interface to cause the image 702 displayed by the swivel viewer 700 to be replaced by a different image.

Additionally, the swivel viewer 700 includes multiple snapshots 704 a user may select to cause the image 702 displayed by the swivel viewer 700 to rotate to a given image. For example, the snapshots 704 may include a perspective, front, right, back, left, top, and bottom view images. In one example, a user may select a top snapshot, and the image 702 may fade out. Subsequently, an image generated based on a rendering of the 3D object data model from a top camera position may fade in. In another example, a user may select a right snapshot, and the image displayed by the swivel viewer may animate through a number of images captured between the front and right of the 3D object data model before displaying an image generated based on a rendering of the 3D object model from a right camera position. For instance, if the right snapshot is an image captured at 90 degrees and the image 702 displayed by the swivel viewer 700 is an image captured at 0 degrees, the swivel viewer 700 may sequentially display image at camera positions between 0 degrees and 90 degrees (e.g., 5 degrees, 10 degrees, 15 degrees . . . 85 degrees).

In one example implementation, 74 images of a 3D object data model may be rendered by a server. For example, a server may determine an appropriate 3D object data model based on parameters associated with a request for the 3D object data model. Images of the 3D object data model may then be generated from 72 predetermined positions covering 360 degrees around the 3D object data model. For example, images may be captured at 5 degree increments (i.e., 0 degrees, 5 degrees, 10 degrees . . . 355 degrees). Additionally, a $73^{rd}$ and $74^{th}$ image may be generated for a top and bottom of the 3D object data model by rendering the 3D object data model having a top and bottom camera position. Subsequently, the server may send the rendered images to the client device for display via the swivel viewer 700. Other example numbers of images and predetermined positions are also possible, and the example is not meant to be limiting. For instance, the swivel viewer 700 may be modified to also include images captured at predetermined positions around a second axis of rotation of the 3D object data model.

In some examples, video compression and decompression techniques may be used to reduce a data transmission size of the rendered images. For example, images of rendered views of the 3D object data model may be combined into a video and the video may be compressed using any number of video compression techniques. For example, the video compression may be lossy or lossless, and may operate on square blocks of neighboring pixels, or macroblocks. In one instance, a video compression codec may send only the difference within the macroblocks between images or frames of the video. Other types of video compression and codecs are also possible.

The compressed video may then be provided to the client device. The client device may use native decompression video techniques (e.g., decompression techniques commonly found within web browsers for streaming video) to decompress the video. Subsequently, the rendered images from the multiple views of the 3D object data model may be recovered and identified as individual images. In one example, the client device may store the individual images within a memory of the client device that can be retrieved by the swivel viewer 700 for display.

In one example, the images recovered by the swivel viewer 700 may be caused to be sequentially displayed in the swivel viewer 700. For example, the swivel viewer 700 may display each of the rendered images briefly such that the 3D object data model appears to have rotated 360 degrees. In a further instance, images recovered from the video may be progressively displayed as the images are discovered. For instance, as a rendered image is recovered the rendered image may be displayed by the swivel viewer 700. In some instances, multiple rendered images of the video may be displayed before the entire video has been received by the swivel viewer 700.

In another example, a server may render a second group of images having a higher resolution that the first rendered images. For example, the second group of images may be rendered based on a 3D object data model that is rendered having a higher zoom level, more detailed geometry, and/or more detailed material information. The second group of rendered images may also be images captured at the same predetermined positions around the axis of rotation of the 3D object data model as the first group of rendered images. Additionally, the second group of rendered images may be combined into a video, compressed by the server, and provided to the client device.

In one instance, the client device may decompress the video of the higher resolution images and recover the individual higher resolution images. In some examples, the higher resolution compressed video may be received after the first video is received, and the recovered higher resolution images may replace the first stored individual images. For instance, if the swivel viewer 700 is caused to display another rendered image of the 3D object data model after the second video has been received, the swivel viewer 700 may display a higher resolution image captured based on the same predetermined view as an originally stored image instead of displaying the original, low resolution image for the viewpoint. In some examples, providing the higher resolution images in the swivel viewer 700 may provide higher quality images of the 3D object data model that can be zoomed in on and optionally panned by a user without a discernible decrease in image quality or resolution. For instance, in one example, an image of the first group may be visibly pixelated when zoomed in on. However, a higher resolution image recovered from the second video may not be visibly pixelated when zoomed in on.

Figure 8:
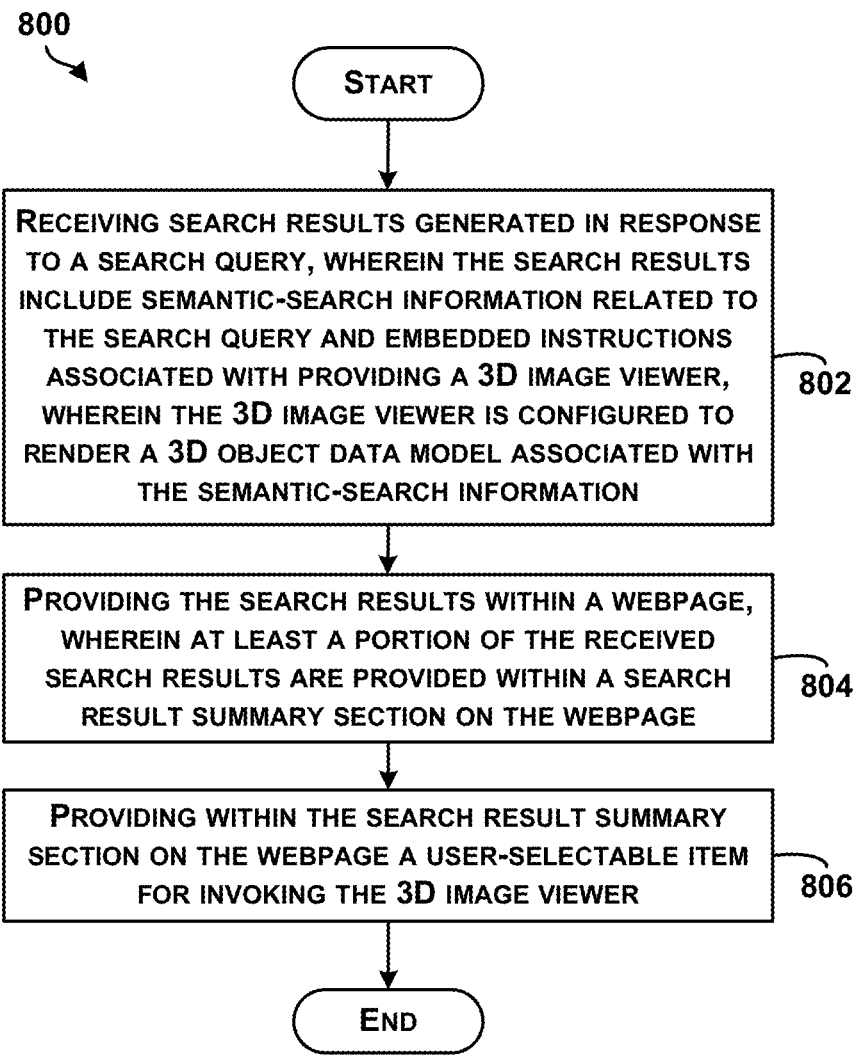
FIG. 8 is a block diagram of another example method for providing a three-dimensional (3D) image viewer associated with a webpage.

In some examples, a webpage that is configured to receive and submit search queries to a search engine may be configured to provide a 3D image viewer. For instance, search results generated in response to a search query may include embedded language associated with providing a three-dimensional (3D) image viewer. FIG. 8 is a block diagram of another example method 800 for providing a 3D image viewer associated with a webpage.

Method 800 may include one or more operations, functions, or actions as illustrated by blocks 802-806 of the flow chart. Although the blocks are illustrated in a sequential order, these blocks may also be performed in parallel, and/or in a different order than those described herein. Also, the various blocks may be combined into fewer blocks, divided into additional blocks, and/or removed from the flow chart, based upon the desired implementation of the method 600. Each block may represent a module, a segment, or a portion of program code, which includes one or more instructions executable by a processor for implementing specific logical functions or steps in the process. In addition, each block in FIG. 8 may represent circuitry that is wired to perform the specific logical functions in the process.

Initially, at block 802, the method 800 involves receiving search results generated in response to a search query. In one example, a search query, such as a text query, image query, or voice query may be submitted to a webpage. Upon receiving the search query, a computing device providing the webpage may submit the search query to a search engine. The search engine may then determine information related to the search query and return search results to the computing device. The search results may include links to documents, images, webpages, or other types of information related to the search query.

In some examples, the search results may also include semantic-search information related to the search query. Semantic-search information may be determined using semantics, the science of meaning in language, to help understand the intent of a search query and the contextual meaning of terms in the search query. Semantic-search information may provide specific information related to a search query, as opposed to a list of documents. In some instances, semantic-search information may provide information that allows a user to resolve a search query without having to navigate to other sites and assemble information themselves. For example, if a search query is related to a specific person, place, or thing, semantic-search information may provide a summary of facts about the specific person, place, or thing. As an example, if the search query is the title of a movie, the semantic-search information may provide facts about the movie that are presented in a readily-viewable form along with the search results. If a user was interested in facts about the movie, the user may quickly view the facts about the movie within the semantic-information section without having to navigate to an additional webpage or download a document. In some instances, semantic-search information may also provide links to other related searches based on relationships between different peoples, places, and things which are contained in a semantic network. Note that semantic-search information related to a search query may also be provided in the event that the search query is an image query or a voice query.

Additionally, the search results may include embedded instructions associated with providing a 3D image viewer. For example, the search results may include a portion of code for providing a 3D image viewer associated with the semantic-search information. The portion of code may trigger the computing device that is receiving the search results to request a 3D image viewer from a server. For instance, the portion of code may trigger execution of one or more API function-calls for providing the 3D image viewer in association with the search results.

In some examples, the embedded instructions may define customization or default parameters for the 3D image viewer (e.g., size, background image, overlays, embeddable buttons, etc.). The 3D image viewer may be configured to render a 3D object data model associated with the semantic-search information, and may be similar to any of the 3D image viewers described herein. The embedded instructions may also define customization or default parameters for the 3D object data model (e.g., 3D pose, camera position, level of zoom, animation sequence, annotation for a component of the 3D object data model, shader, mesh resolution or size, etc.).

At block 804, the method 800 includes providing the search results within a webpage. In one example, the webpage may be provided on a web browser of a client device such as a desktop computer, tablet computer, mobile device, television, wearable computer, or other type of computing device.

Figure 9:
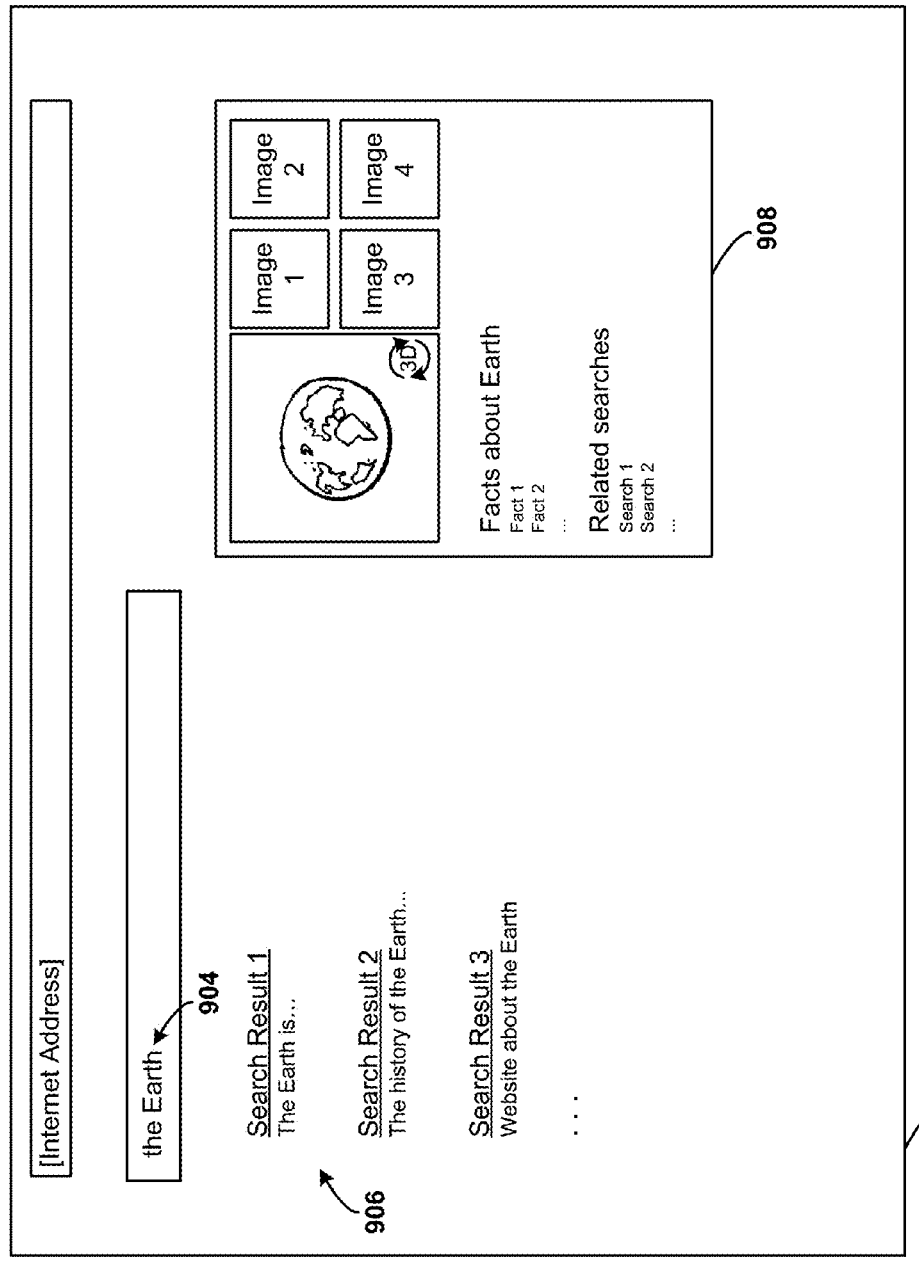
FIG. 9 shows a conceptual illustration of example search results provided within a webpage.

Turning briefly to FIG. 9, FIG. 9 shows a conceptual illustration of example search results provided within a webpage 902. As shown in FIG. 9, in response to receiving a search query 904, the webpage 902 may provide search results related to the search query 904. The search results provided within the webpage 902 may include a list of links 906 to documents, webpages, images, videos, or other objects related to the search query. Additionally, at least a portion of the search results may be provided within a search result summary section 908. By way of example, the search result summary section 908 may take the form of a card of information provided within a sidebar of the webpage 902. The sidebar may be a distinct section of the webpage, such as a rectangular element, for example, displayed alongside the top, bottom, or side of a webpage. In one instance, the search result summary section 908 may provide information related to a particular search result of the received search results. However, the example is not meant to be limiting. The search result summary section need not be presented within a separate element of the webpage, and may, for example, be provided inline with the other search results.

Referring back to FIG. 8, at block 806, the method 800 includes providing within the search result summary section on the webpage a user-selectable item for invoking the 3D image viewer. In one example, the user-selectable item may be a text element or link. In another example, the user-selectable item may be an icon that is presented when a user hovers over the search result summary section. In still another example, the user-selectable item may be a 2D image of an object represented by the 3D object data model. The user-selectable item may be any type of user-selectable indication that suggests that there is a 3D image viewer associated with the search result summary section. Other forms of user-selectable items that provide a mechanism allowing a user to invoke the 3D image viewer are also possible, and the examples are not meant to be limiting.

In a further example, the method 800 may also include invoking or initiating the 3D image viewer in response to receiving information indicative of a selection of the user-selectable item. For example, in response to receiving information indicative of a request to invoke the 3D image viewer, the method 800 may include requesting information associated with rendering the 3D object data model in the 3D image viewer based on the embedded instructions. In some examples, the embedded instructions may identify the 3D object data model and one or more parameters associated with rendering the 3D object data model. The embedded instructions may therefore trigger the computing device to request information associated with rendering the identified 3D object data model from a server according to the parameters associated with rendering the 3D object data model. The embedded instructions may also trigger the computing device to request resources from the server for providing the 3D image viewer associated with the webpage.

In response to requesting information associated with rendering the 3D object data model in the 3D image viewer, the computing device may receive information associated with rendering the 3D object data model in the 3D image viewer. For example, the requested information may be received from one or more servers. The received information may extend the capabilities of the web browser providing the webpage, and allow the web browser to provide the 3D image viewer associated with the webpage.

In one example, information may be received from a server to allow a scripting language to generate an interactive 3D object within the 3D image viewer. For example, the received information may include commands or function calls associated with WebGL, Open GL ES, or other graphics software for rendering real-time, interactive 3D graphics based on properties of the 3D object data model. In one instance, a rendering pipeline may be used to carry out multiple draw jobs or calls within a graphics processing unit. Scripting language may be used to specify where in a 3D scene to draw a unit (such as a triangle), and how the unit should look (e.g., a color, shade, texture, etc.). The information may then be provided to the graphics processing unit which renders the scene.

Additionally, based on the received information, the 3D object data model may be rendered in the 3D image viewer. For example, the received information may be used to render an interactive 3D graphic in the 3D image viewer. A user may then interact with the 3D image viewer to pan, orbit, and/or zoom in on the 3D object data model. Optionally, the 3D object data model may be rendered in the 3D image viewer in response to receiving information indicative of a request to invoke the 3D image viewer. For example, a user may click on or otherwise select the provided user-selectable item for invoking the 3D image viewer. In response to receiving information indicative of the selection, the 3D image viewer may then render the 3D object data model in the 3D image viewer.

In some examples, in response to the computing device requesting the information associated with rendering the 3D object data model, the computing device may receive a static rendered image of the 3D object data model. For example, the static rendered image may be an image of the 3D object data model that a server renders, or has previously rendered, based on one or more parameters that are specified in the embedded instructions. The parameters may define a particular 3D pose and camera position for rendering the 3D object data model, for example. When the 3D image viewer is initiated, the computing device may initially provide the static rendered image for display within the 3D image viewer. Subsequently, when information associated with rendering the 3D objet data model is received by the computing device, the computing device may replace the static rendered image with an interactive rendering of the 3D object data model.

Figure 10A:
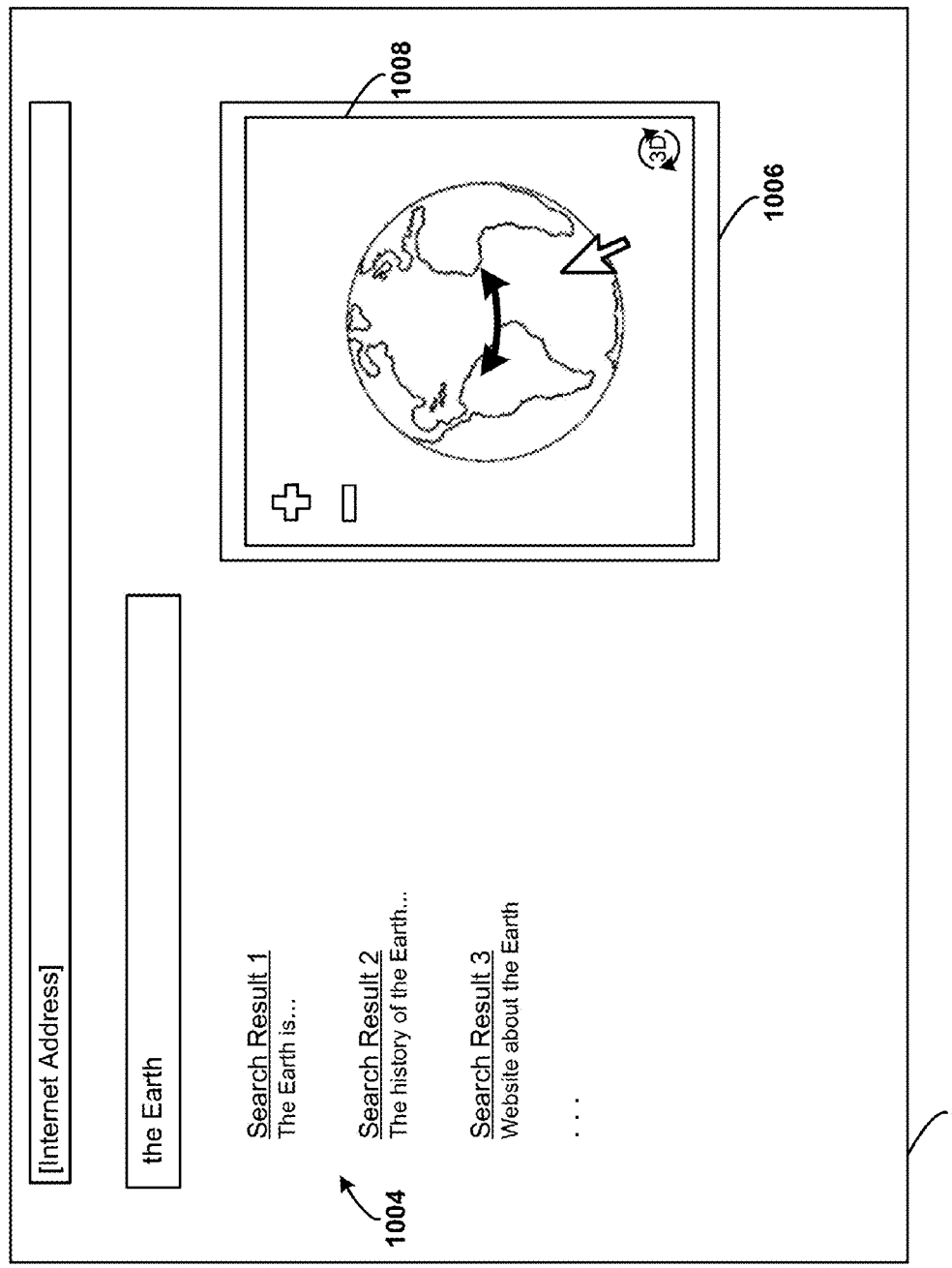
FIGS. 10A-10C show additional example displays of a three-dimensional (3D) image viewer.
Figure 10B:
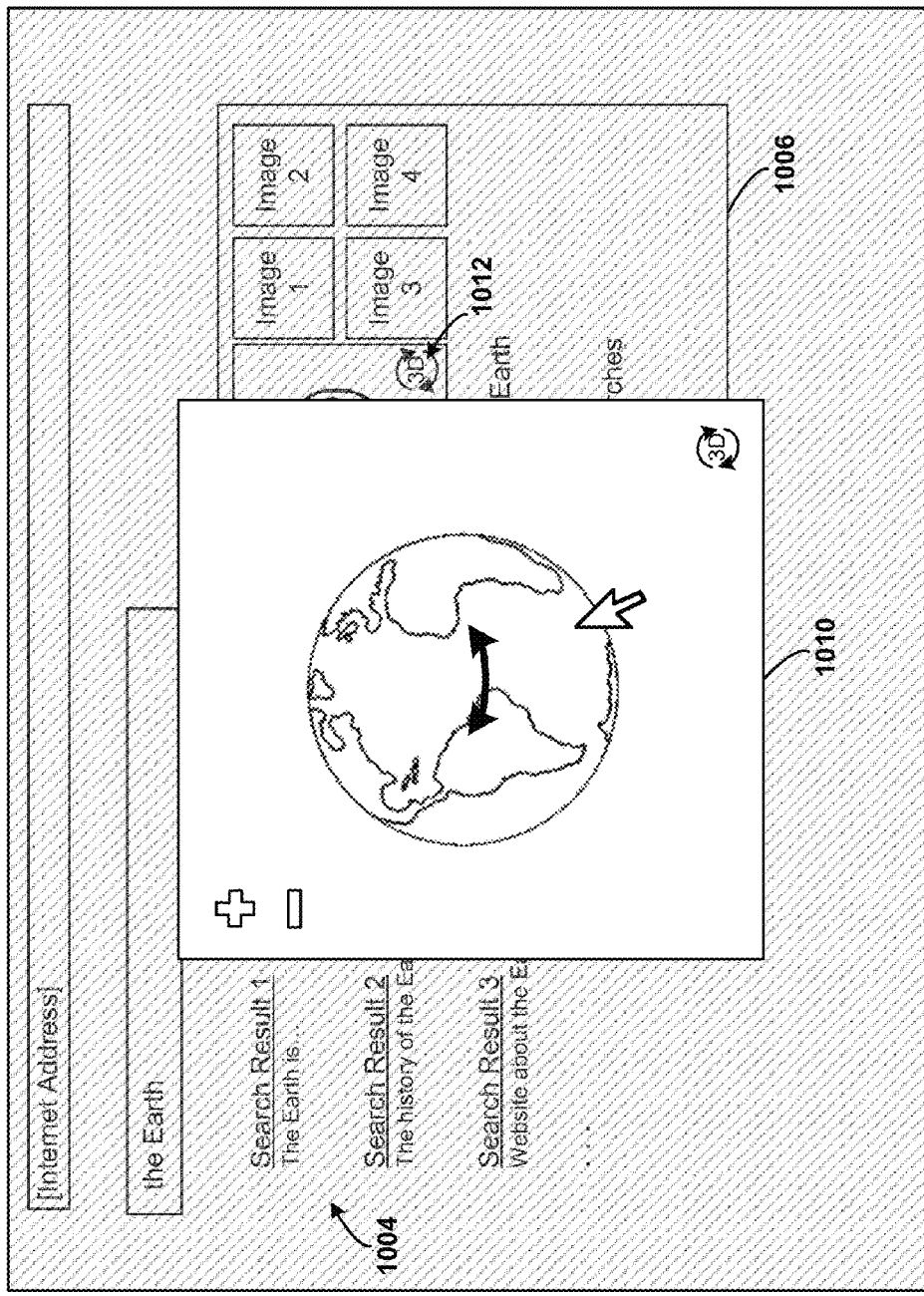

FIGS. 10A-10B show additional example displays of a three-dimensional (3D) image viewer. FIGS. 10A and 10B illustrate a webpage 1002 providing search results. The webpage 1002 may be similar to the webpage 902 described above with respect to FIG. 9. For example, the webpage 1002 may include a list of links 1004 to documents, webpages, images, videos, or other objects related to a search query. Further, the webpage 1002 may include a search result summary section 1006 providing semantic-search information associated with a particular search result.

As shown in FIG. 10A, in response to receiving information indicative of a request to invoke a 3D image viewer, the 3D image viewer 1008 associated with the webpage 1002 may be initiated within the search result summary section 1006. In one instance, in response to receiving a selection of a user-selectable item for invoking the 3D image viewer 1008 associated with the webpage 1002, the 3D image viewer 1008 may expand within the borders of the search result summary section 1006 and overlay other information that was previously presented within the search result summary section 1006. For example, a user may click on or otherwise select a 3D icon, causing the 3D image viewer 1008 to be presented within the search result summary section 1006. A user may then interact with the 3D image viewer 1008 to explore the 3D object data model rendered in the 3D image viewer 1008. For example, a user may rotate the Earth using a cursor or other pointing device. Other input mechanisms and interfaces may also be used to explore the 3D object data model.

As shown in FIG. 10B, in another example, in response to receiving information indicative of a request to invoke a 3D image viewer, the 3D image viewer 1010 may be initiated in an application overlaying the webpage 1002. For instance, in response to receiving information indicating a selection of the icon 1012, the 3D image viewer 1012 may pop-up and overlay the webpage 1002. The application may be a plug-in or other type of web-based applet that runs within the scope of a web browser that provides the webpage. A user may then interact with the 3D image viewer 1010 to explore the 3D object data model rendered in the 3D image viewer 1010.

Figure 10C:
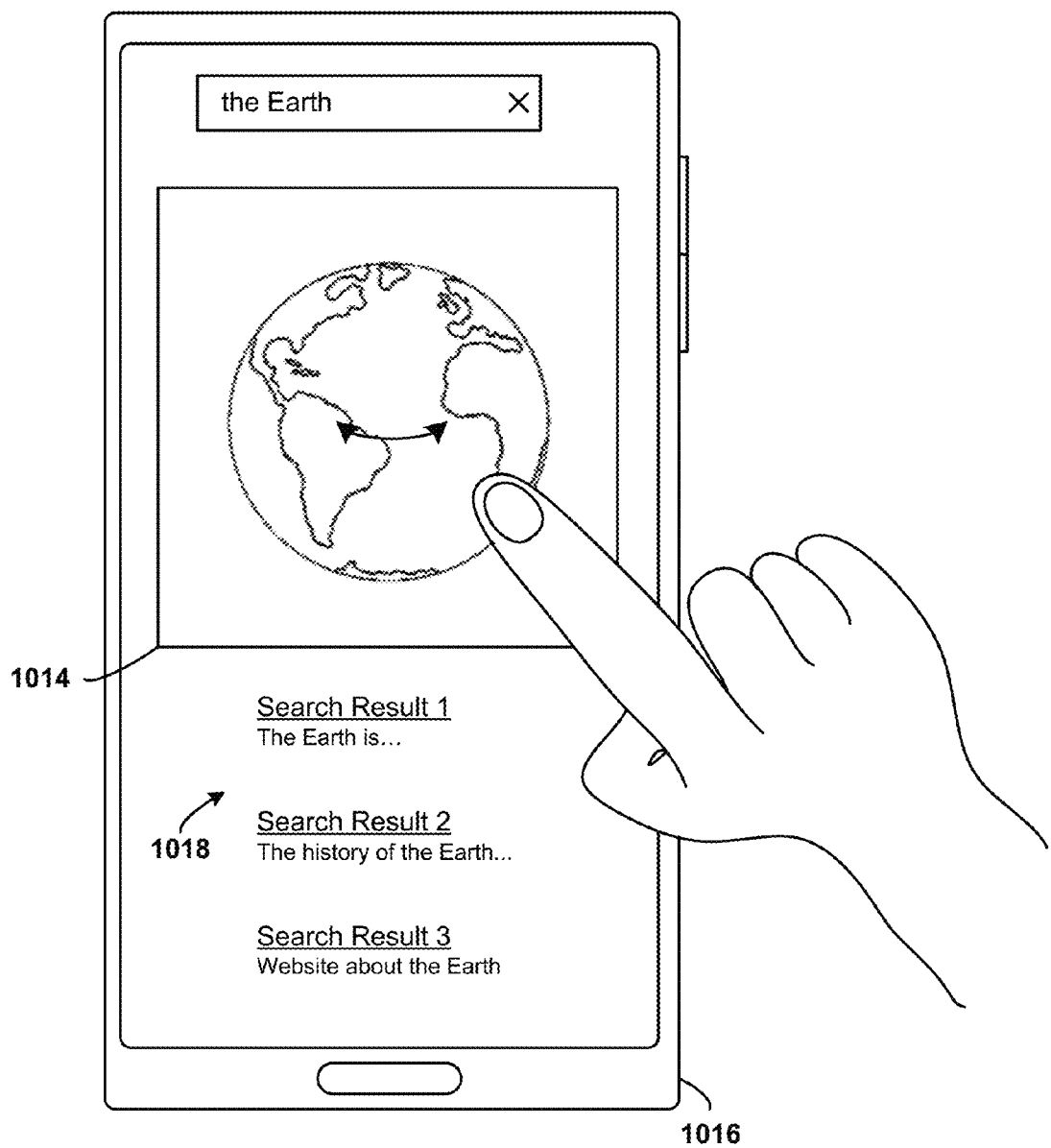

FIG. 10C illustrates an additional example display of a 3D image viewer 1014. As shown in FIG. 10C, the 3D image viewer 1014 may be provided on a mobile device 1016. The mobile device 1016 may be any type of mobile device such as a mobile phone, tablet, laptop, wearable computing device, etc. Additionally, the 3D image viewer 1014 may be compatible with any operating system.

In one example, the 3D image viewer 1014 may be provided by an application on the mobile device 1016. The application may allow a user to submit a search query, such as a text query, voice query, or image query. The application may then send the search query to a server. In response to sending the search query to the server, the application may receive search results generated in response to the search query. The search results may include embedded instructions that enable the application to provide the 3D image viewer 1014. Additionally, based on the search results, the application may provide a list of links 1018 to documents, webpages, images, videos, or other objects related to the search query. A user may then interact with the 3D image viewer to rotate a model of the Earth, for example.

In one instance, the application may be a web browser. However, the example is not meant to be limiting, and other examples are also possible. For instance, the application may be an application provided by a search engine that provides search results in response to user-submitted search queries.

Figure 11:
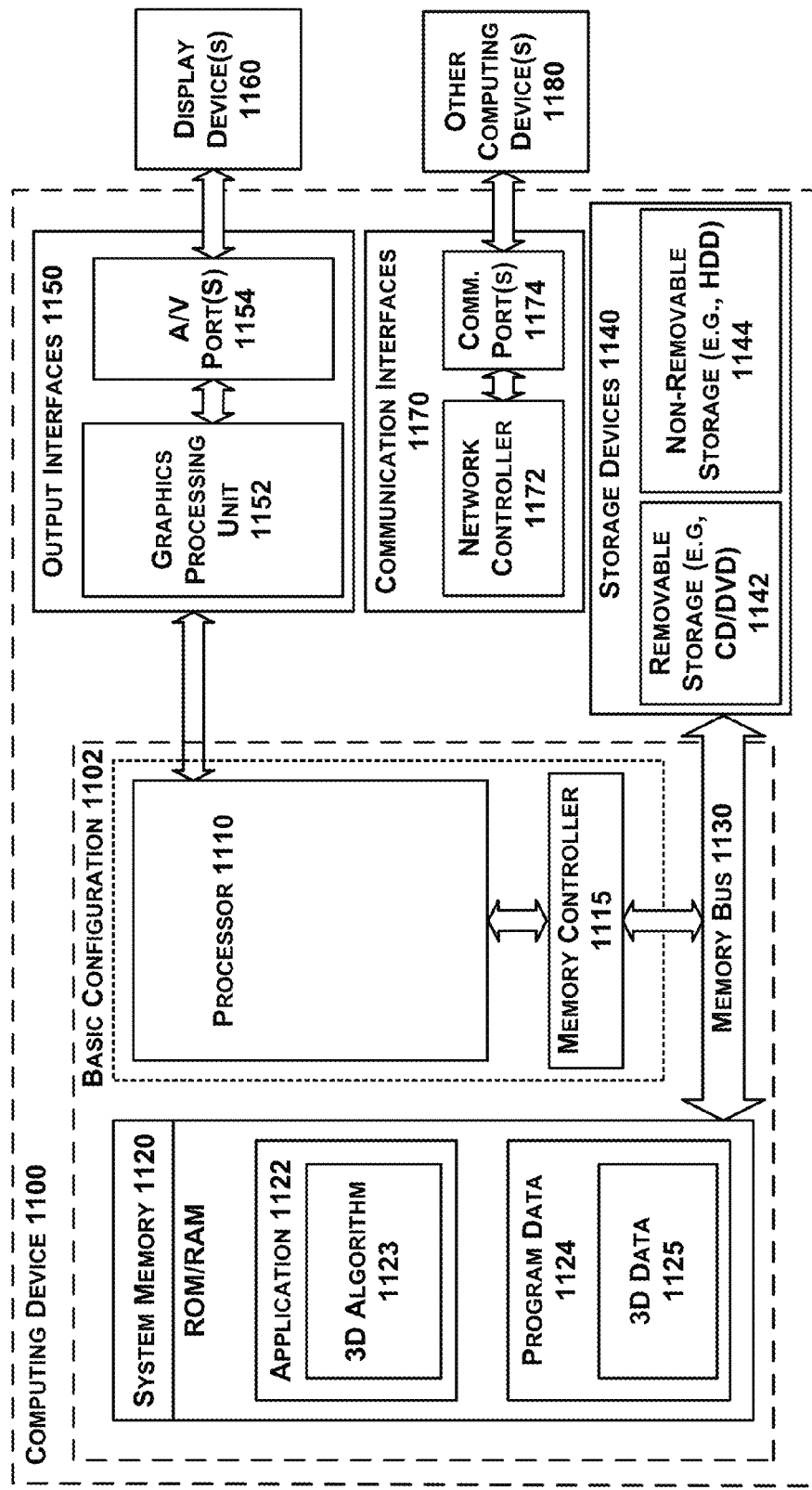
FIG. 11 is a functional block diagram illustrating an example computing device used in a computing system that is arranged in accordance with at least some embodiments described herein.

FIG. 11 is a functional block diagram illustrating an example computing device 1100 used in a computing system that is arranged in accordance with at least some embodiments described herein. The computing device 1100 may be a personal computer, mobile device, cellular phone, touch-sensitive wristwatch, tablet computer, video game system, or global positioning system, and may be implemented to provide a system for providing a three-dimensional (3D) image viewer in a webpage as described in FIGS. 1-10C. In a basic configuration 1102, computing device 1100 may typically include one or more processors 1110 and system memory 1120. A memory bus 1130 can be used for communicating between the processor 1110 and the system memory 1120. Depending on the desired configuration, processor 1110 can be of any type including but not limited to a microprocessor (µP), a microcontroller (µC), a digital signal processor (DSP), or any combination thereof. A memory controller 1115 can also be used with the processor 1110, or in some implementations, the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 may include one or more applications 1122, and program data 1124. Application 1122 may include a 3D algorithm 1123 that is arranged to provide inputs to the electronic circuits, in accordance with the present disclosure. Program data 1124 may include 3D information 1125 that could be directed to any number of types of data. In some example embodiments, application 1122 can be arranged to operate with program data 1124 on an operating system.

Computing device 1100 can have additional features or functionality, and additional interfaces to facilitate communications between the basic configuration 1102 and any devices and interfaces. For example, data storage devices 1140 can be provided including removable storage devices 1142, non-removable storage devices 1144, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1120 and storage devices 1140 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include output interfaces 1150 that may include a graphics processing unit 1152, which can be configured to communicate to various external devices such as display devices 1160 or speakers via one or more A/V ports 1154 or a communication interface 1170. The communication interface 1170 may include a network controller 1172, which can be arranged to facilitate communications with one or more other computing devices 1180 over a network communication via one or more communication ports 1174. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

Figure 12:
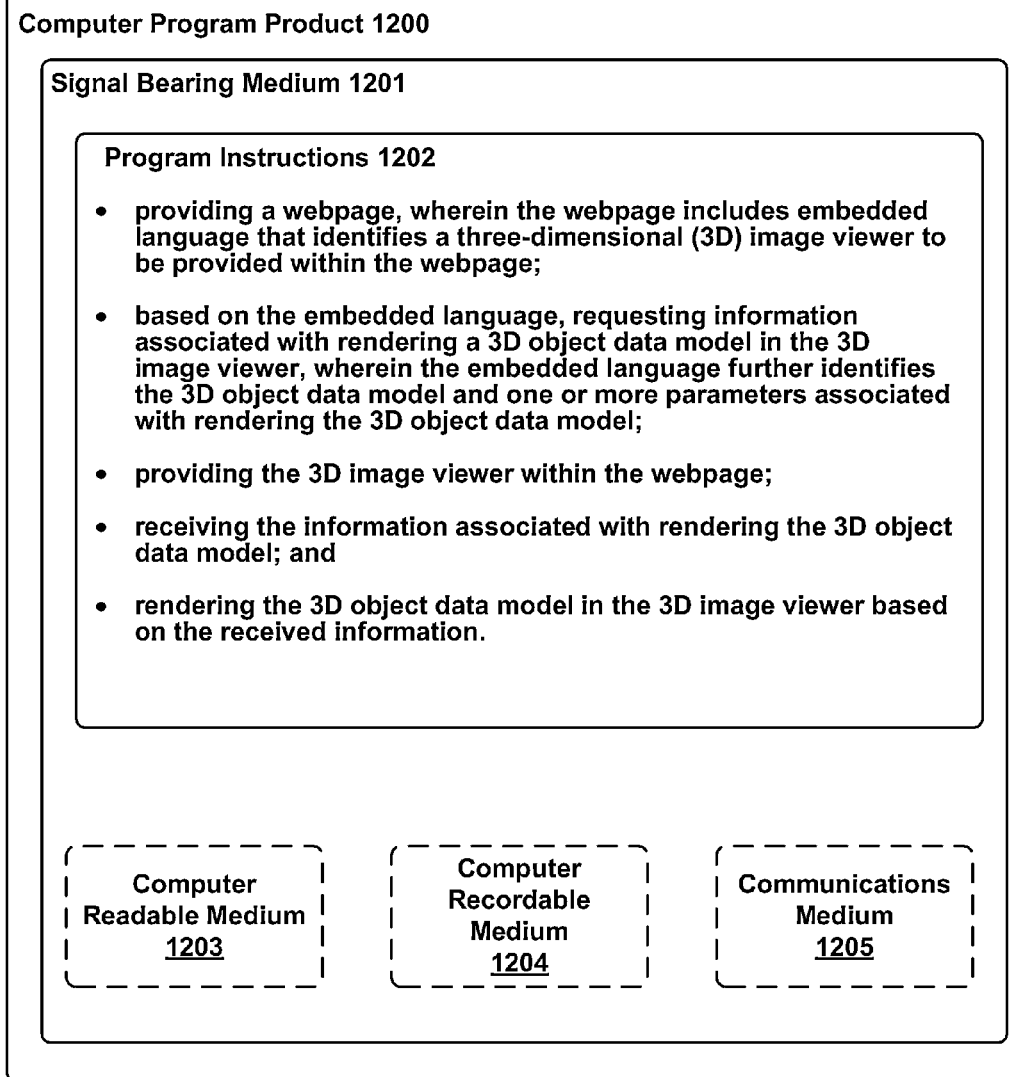
FIG. 12 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 12 is a schematic illustrating a conceptual partial view of an example computer program product 1200 that includes a computer program for executing a computer process on a computing device, arranged according to at least some embodiments presented herein.

In one embodiment, the example computer program product 1200 is provided using a signal bearing medium 1201. The signal bearing medium 1201 may include one or more programming instructions 1202 that, when executed by one or more processors may provide functionality or portions of the functionality described above with respect to FIGS. 1-11. In some examples, the signal bearing medium 1201 may encompass a computer-readable medium 1203, such as, but not limited to, a hard disk drive, a Compact Disc (CD), a Digital Video Disk (DVD), a digital tape, memory, etc. In some implementations, the signal bearing medium 1201 may encompass a computer recordable medium 1204, such as, but not limited to, memory, read/write (R/W) CDs, R/W DVDs, etc. In some implementations, the signal bearing medium 1201 may encompass a communications medium 1205, such as, but not limited to, a digital and/or an analog communication medium (e.g., a fiber optic cable, a waveguide, a wired communications link, a wireless communication link, etc.). Thus, for example, the signal bearing medium 1201 may be conveyed by a wireless form of the communications medium 1205 (e.g., a wireless communications medium conforming with the IEEE 802.11 standard or other transmission protocol).

The one or more programming instructions 1202 may be, for example, computer executable and/or logic implemented instructions. In some examples, a computing device such as the computing device 1100 of FIG. 11 may be configured to provide various operations, functions, or actions in response to the programming instructions 1202 conveyed to the computing device 1100 by one or more of the computer readable medium 1203, the computer recordable medium 1204, and/or the communications medium 1205.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
receiving search results generated in response to a search query, wherein the search results include links to information related to the search query, semantic-search information related to the search query that identifies a particular object related to the search query, and embedded instructions associated with providing a three-dimensional (3D) image viewer within a search result summary section, and wherein the 3D image viewer is configured to render a 3D object data model of the particular object;
providing the search results within a webpage, wherein at least a portion of the links to information related to the search query are provided on the webpage within a list that is separate from the search result summary section, and wherein at least a portion of the semantic-search information is provided within the search result summary section on the webpage; and
embedding the 3D image viewer within the search result summary section on the webpage in accordance with the embedded instructions.

2. The method of claim 1:
wherein the search result summary section is provided within a sidebar of the webpage, and
wherein information related to a particular search result of the received search results is provided within the search result summary section.

3. The method of claim 1, further comprising:
requesting information associated with rendering the 3D object data model in the 3D image viewer based on the embedded instructions;
receiving the information associated with rendering the 3D object data model in the 3D image viewer; and
rendering the 3D object data model in the 3D image viewer based on the received information.

4. The method of claim 3, further comprising causing the 3D image viewer to be initiated in an application overlaying the webpage in response to receiving information indicative of a request to interact with the 3D image viewer.

5. The method of claim 3, further comprising causing the 3D image viewer to be initiated within the search result summary section in response to receiving information indicative of a request to interact with the 3D image viewer.

6. The method of claim 3, wherein rendering the 3D object data model in the 3D image viewer based on the received information comprises a computing device converting the 3D object data model into one or more two-dimensional (2D) images based on the received information.

7. The method of claim 1, wherein the embedded instructions define one or more parameters associated with the 3D object data model, wherein the one or more parameters comprise at least one of a 3D pose, a camera position, a level of zoom, an animation, an annotation for a component of the 3D object data model, and a shader.

8. The method of claim 7, wherein the embedded instructions comprise one or more application programming interface (API) function calls for requesting the information associated with rendering the 3D object data model based on the one or more parameters associated with the 3D object data model.

9. The method of claim 7, further comprising:
requesting information associated with rendering the 3D object data model in the 3D image viewer based on the embedded instructions;
receiving a static rendered image of the 3D object data model, wherein the static rendered image is rendered based on the one or more parameters defined in the embedded instructions;
providing for display the static rendered image within the 3D image viewer; and
replacing the static rendered image with an interactive rendering of the 3D object data model when the information associated with rendering the 3D object data model is received.

10. A computing device, comprising:
a processor; and
a computer-readable medium, configured to store instructions, that when executed by the processor cause the computing device to perform functions comprising:
receiving search results generated in response to a search query, wherein the search results include links to information related to the search query, semantic-search information related to the search query that identifies a particular object related to the search query, and embedded instructions associated with providing a three-dimensional (3D) image viewer within a search result summary section, and wherein the 3D image viewer is configured to render a 3D object data model of the particular object;
providing the search results within a webpage, wherein at least a portion of the links to information related to the search query are provided on the webpage within a list that is separate from the search result summary section, and wherein at least a portion of the semantic-search information is provided within the search result summary section on the webpage; and
embedding the 3D image viewer within the search result summary section on the webpage in accordance with the embedded instructions.

11. The computing device of claim 10:
wherein the search result summary section of the webpage comprises a sidebar of the webpage, and
wherein information related to a particular search result of the received search results is provided within the search result summary section.

12. The computing device of claim 10, wherein the functions further comprise:
requesting information associated with rendering the 3D object data model in the 3D image viewer based on the embedded instructions;
receiving the information associated with rendering the 3D object data model in the 3D image viewer; and
rendering the 3D object data model in the 3D image viewer based on the received information.

13. The computing device of claim 12, wherein the functions further comprise causing the 3D image viewer to be initiated in an application overlaying the webpage in response to receiving information indicative of a request to interact with the 3D image viewer.

14. The computing device of claim 12, wherein the functions further comprise causing the 3D image viewer to be initiated within the search result summary section of the webpage in response to receiving information indicative of a request to interact with the 3D image viewer.

\* \* \* \* \*